United States Patent
Lee

(10) Patent No.: US 11,093,198 B2
(45) Date of Patent: Aug. 17, 2021

(54) MOBILE ELECTRONIC DEVICE AND METHOD FOR FORWARDING USER INPUT TO APPLICATION ACCORDING TO INPUT MEANS

(71) Applicant: Samsung Electronics Co., Ltd., Suwon-si (KR)

(72) Inventor: Jeong Pyo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/217,793

(22) Filed: Dec. 12, 2018

(65) Prior Publication Data

US 2019/0294400 A1 Sep. 26, 2019

(30) Foreign Application Priority Data

Mar. 26, 2018 (KR) .......................... 10-2018-0034354

(51) Int. Cl.
*G06F 3/14* (2006.01)
*G06F 3/0488* (2013.01)
*G06F 9/54* (2006.01)

(52) U.S. Cl.
CPC .......... *G06F 3/1423* (2013.01); *G06F 3/0488* (2013.01); *G06F 9/543* (2013.01)

(58) Field of Classification Search
CPC ....... G06F 3/1423; G06F 3/0488; G06F 9/543
See application file for complete search history.

(56) References Cited

U.S. PATENT DOCUMENTS

| 4,517,640 A | * | 5/1985 | Hattori | .................... G06F 8/312 711/126 |
| 4,794,521 A | * | 12/1988 | Ziegler | ................. G06F 12/084 711/130 |

(Continued)

FOREIGN PATENT DOCUMENTS

| CN | 102238279 A | 11/2011 |
| CN | 102905014 A | 1/2013 |

(Continued)

OTHER PUBLICATIONS

"FILO (First In, Last Out) Definition", TechTerms, published on Aug. 7, 2014 to https://techterms.com/definition/filo, retrieved on Feb. 3, 2021. (Year: 2014).*

(Continued)

*Primary Examiner* — Shourjo Dasgupta
(74) *Attorney, Agent, or Firm* — Jefferson IP Law, LLP

(57) ABSTRACT

A mobile electronic device for forwarding a user input to an application is provided. The mobile electronic device includes a connector, a touch screen display, a memory including a first area and a second area, a wireless communication circuit, and at least one processor. The at least one processor is configured to execute a first application included in the first area of the memory, display a screen of the first application on the touch screen display, execute a second application included in the second area of the memory when being connected to an external interface device through the connector, transmit data related to a screen of the second application through the connector to the external interface device, and forward a first user input through the touch screen display to the first application and not forward to the second application.

19 Claims, 9 Drawing Sheets

(56) References Cited

U.S. PATENT DOCUMENTS

| | | | | |
|---|---|---|---|---|
| 5,892,944 | A * | 4/1999 | Fukumoto | G06F 9/468 718/100 |
| 7,926,072 | B2 | 4/2011 | Teng et al. | |
| 8,165,886 | B1 * | 4/2012 | Gagnon | G10L 15/19 704/275 |
| 8,370,860 | B2 | 2/2013 | Teng et al. | |
| 8,566,848 | B2 | 10/2013 | Teng et al. | |
| 8,589,952 | B2 | 11/2013 | Wong et al. | |
| 8,613,070 | B1 * | 12/2013 | Borzycki | G06F 9/543 726/8 |
| 8,718,556 | B2 | 5/2014 | Lee et al. | |
| 8,738,750 | B2 * | 5/2014 | Chaudhri | H04L 63/20 709/223 |
| 8,819,705 | B2 | 8/2014 | Reeves et al. | |
| 8,949,873 | B1 * | 2/2015 | Bayer | H04N 21/44222 725/14 |
| 8,959,535 | B2 | 2/2015 | Teng et al. | |
| 9,298,338 | B2 | 3/2016 | Holland et al. | |
| 9,369,820 | B2 | 6/2016 | Jan et al. | |
| 9,442,743 | B2 | 9/2016 | Kim et al. | |
| 9,536,063 | B2 * | 1/2017 | Xing | G06F 21/12 |
| 9,575,924 | B2 | 2/2017 | Lee | |
| 9,645,782 | B2 | 5/2017 | Holland et al. | |
| 9,686,259 | B2 * | 6/2017 | Chaudhri | H04L 63/20 |
| 9,836,264 | B2 | 12/2017 | Teng et al. | |
| 9,876,887 | B2 | 1/2018 | Zhao et al. | |
| 9,967,386 | B2 | 5/2018 | Ji et al. | |
| 10,198,337 | B2 | 2/2019 | Lee | |
| 10,678,411 | B2 | 6/2020 | Reeves et al. | |
| 2006/0242066 | A1 * | 10/2006 | Jogand-Coulomb | G06F 21/10 705/50 |
| 2008/0256519 | A1 * | 10/2008 | Shen | G06F 9/4486 717/128 |
| 2009/0085920 | A1 | 4/2009 | Teng et al. | |
| 2009/0100447 | A1 * | 4/2009 | Beynon | G06F 9/543 719/329 |
| 2009/0138729 | A1 * | 5/2009 | Hashimoto | G06F 21/54 713/193 |
| 2010/0138780 | A1 | 6/2010 | Marano et al. | |
| 2010/0153667 | A1 * | 6/2010 | Andersson | G06F 21/123 711/162 |
| 2011/0173644 | A1 | 7/2011 | Teng et al. | |
| 2011/0208955 | A1 * | 8/2011 | Anbazhagan | G06F 9/4401 713/2 |
| 2012/0005691 | A1 | 1/2012 | Wong et al. | |
| 2012/0036334 | A1 * | 2/2012 | Horman | G06F 9/52 711/165 |
| 2012/0047304 | A1 | 2/2012 | Lee | |
| 2012/0089992 | A1 | 4/2012 | Reeves et al. | |
| 2012/0290680 | A1 * | 11/2012 | Hwang | H04M 1/72412 709/217 |
| 2013/0104062 | A1 | 4/2013 | Reeves et al. | |
| 2013/0139186 | A1 * | 5/2013 | Teng | G06F 3/1415 719/328 |
| 2013/0205403 | A1 * | 8/2013 | Grocutt | G06F 21/52 726/27 |
| 2013/0205413 | A1 * | 8/2013 | Grocutt | G06F 21/52 726/30 |
| 2013/0268702 | A1 * | 10/2013 | Fok | G06F 3/023 710/62 |
| 2013/0273879 | A1 * | 10/2013 | Eisen | H04W 12/0609 455/405 |
| 2014/0033061 | A1 | 1/2014 | Teng et al. | |
| 2014/0057621 | A1 | 2/2014 | Ji et al. | |
| 2014/0075377 | A1 * | 3/2014 | Kang | G06F 3/04842 715/788 |
| 2014/0351722 | A1 | 11/2014 | Frederickson et al. | |
| 2015/0100974 | A1 | 4/2015 | Teng et al. | |
| 2015/0334162 | A1 | 11/2015 | Krishnamurthy | |
| 2015/0339005 | A1 | 11/2015 | Li | |
| 2016/0110076 | A1 | 4/2016 | Reeves et al. | |
| 2016/0241548 | A1 | 8/2016 | Kim et al. | |
| 2017/0123953 | A1 | 5/2017 | Lee | |
| 2017/0212862 | A1 | 7/2017 | Lee | |
| 2017/0251091 | A1 | 8/2017 | Zhao et al. | |
| 2018/0314845 | A1 * | 11/2018 | Anderson | G06F 21/604 |
| 2019/0102538 | A1 * | 4/2019 | Gentili | G06F 13/28 |

FOREIGN PATENT DOCUMENTS

| | | |
|---|---|---|
| CN | 103106109 A | 5/2013 |
| CN | 105247470 A | 1/2016 |
| CN | 107092456 A | 8/2017 |
| KR | 10-2014-0110637 A | 9/2014 |
| KR | 10-2016-0092363 A | 8/2016 |
| KR | 10-2019-0049235 A | 5/2019 |
| WO | 2009/143294 A2 | 11/2009 |

OTHER PUBLICATIONS

Erik Poll, "Memory Management: the Stack & the Heap", published on Aug. 12, 2015 to https://www.cs.ru.nl/~erikpoll/hacking/slides/hic3_stack/pdf, retrieved on Feb. 3, 2021. (Year: 2015).*

A lecture on Stacks, published on Feb. 1, 2001 to http://engr.case.edu/merat_francis/eeap282f97/lectures/23_Stacks.pdf, retrieved on Feb. 3, 2021. (Year: 2001).*

International Search Report dated Mar. 19, 2019, issued in an International application No. PCT/KR2018/015745.

European Extended Search Report dated Feb. 4, 2021; European Appln. No. 18912630.3-1209/3735771 PCT/KR2018015745.

Chinese Office Action with English translation dated Apr. 25, 2021; Chinese Appln. No. 201880089374.1.

* cited by examiner

MOBILE ELECTRONIC DEVICE AND METHOD FOR FORWARDING USER INPUT TO APPLICATION ACCORDING TO INPUT MEANS

CROSS-REFERENCE TO RELATED APPLICATION(S)

This application is based on and claims priority under 35 U.S.C. § 119 of a Korean patent application number 10-2018-0034354, filed on Mar. 26, 2018, in the Korean Intellectual Property Office, the disclosure of which is incorporated by reference herein its entirety.

BACKGROUND

1. Field

The disclosure relates to a technology of displaying a screen of an application included in a separate area of a memory on a separate display and forwarding a user input to an application included in an area corresponding to input means.

2. Description of Related Art

The use of mobile electronic devices such as smart phones, tablet PCs, wearable devices, and the like has been increased. The electronic device may perform various functions such as a call, wireless communication, a video playback, a web search, and the like. The electronic device may be used independently or in connection with an external display device (e.g., a monitor, a television (TV), or the like). For example, the electronic device may be wired or wirelessly connected to a monitor or a TV to output contents (e.g., an image, a text, and the like) of the electronic device to an external display device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for an electronic device to connect to an external display device and outputs the contents of the electronic device, a user may receive a desktop environment by using the electronic device. However, according to the related art, the electronic device may provide only one using environment to the user.

Another aspect of the disclosure is to provide an apparatus and method is to provide a mobile electronic device that can simultaneously execute applications included in a general area and a security using environment, and display an application of each area on a separate display.

Another aspect of the disclosure is to provide an apparatus and method for an electronic device outputs a screen to both the display of the electronic device and an external display device, a user input through an input device cannot be distinguished and processed by display.

Another aspect of the disclosure is to provide a mobile electronic device that can forward a user input to an application displayed on a separate display according to input means.

Additional aspects will be set forth in part in the description which follows and, in part, will be apparent from the description, or may be learned by practice of the presented embodiments.

In accordance with an aspect of the disclosure, a mobile electronic device may include a connector, a touch screen display, a memory including a first area and a second area, a wireless communication circuit, and at least one processor configured to execute a first application included in the first area of the memory, display a screen of the first application on the touch screen display, execute a second application included in the second area of the memory when being connected to an external interface device through the connector, transmit data related to a screen of the second application through the connector to the external interface device, forward a first user input through the touch screen display to the first application and not to the second application, and forward a second user input through a first external input device, which is operatively connected through at least one of the wireless communication circuit or the connector, to the second application and not to the first application.

In accordance with another aspect of the disclosure, a method of processing a user input by a mobile electronic device may include executing a first application included in a first area of a memory, displaying a screen of the first application on a touch screen display of the mobile electronic device, executing a second application included in a second area of the memory when the mobile electronic device is connected to an external interface device, transmitting data related to a screen of the second application to the external interface device, forwarding a first user input received through the touch screen display to the first application and not to the second application, and forwarding a second user input through an external input device, which is operatively connected with the mobile electronic device, to the second application and not to the first application.

In accordance with another aspect of the disclosure, a storage medium storing computer-readable instructions is provided, wherein, when the instructions are executed by a processor of a mobile electronic device, the instructions cause the mobile electronic device to execute a first application included in a first area of a memory, display a screen of the first application on a touch screen display, execute a second application included in a second area of the memory when the mobile electronic device is connected to an external interface device, transmit data related to a screen of the second application to the external interface device, forward a first user input received through the touch screen display to the first application and not to the second application, and forward a second user input through an external input device, which is operatively connected with the mobile electronic device, to the second application and not to the first application.

According to the embodiments, the screen of an application stored in a separate area of a memory may be simultaneously displayed on a separate display.

According to the embodiments, a user input may be forwarded to a separate application for each input device.

In addition, various effects that are directly or indirectly understood through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modification, of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
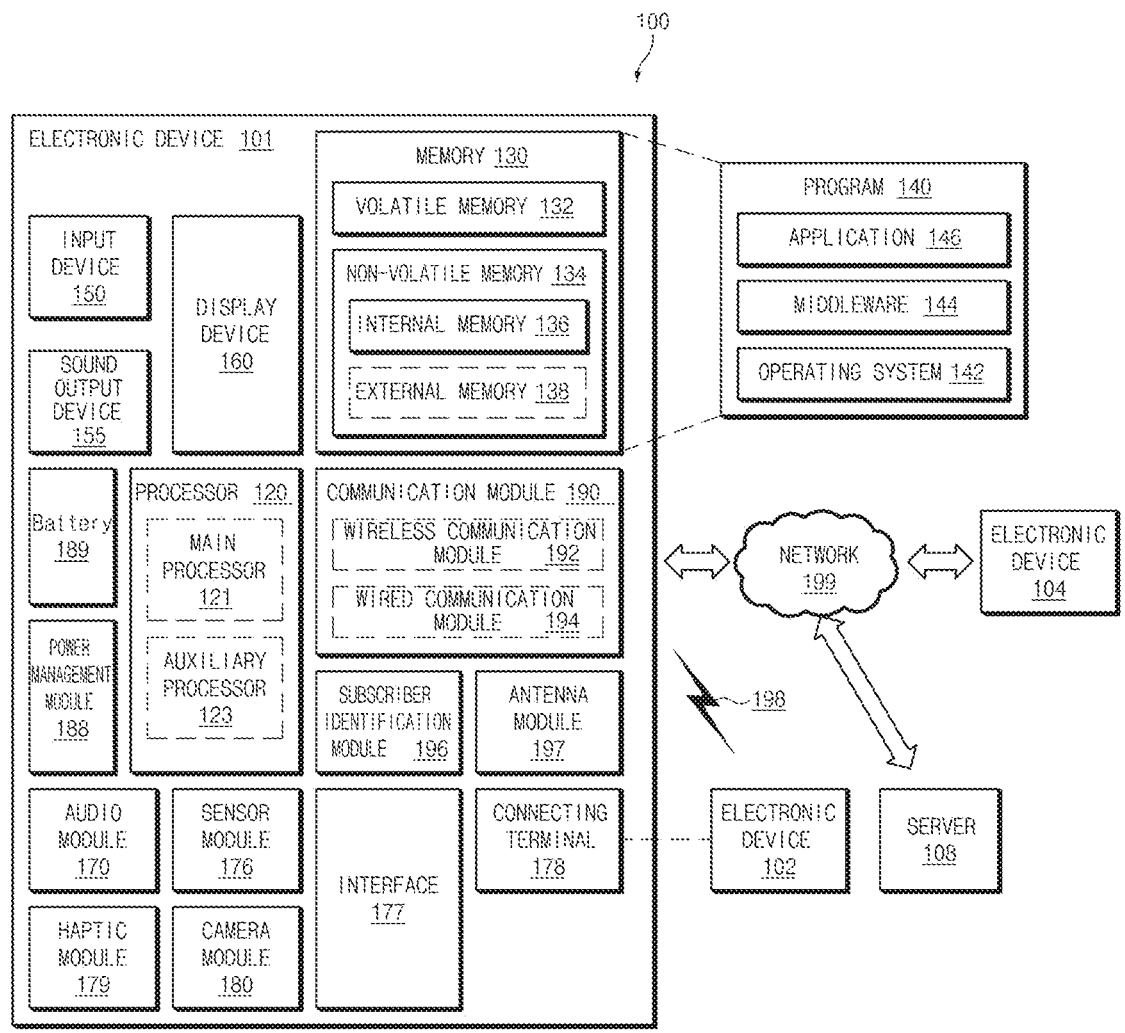
FIG. 1 is a block diagram illustrating an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) operatively related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment of the disclosure, the mobile electronic device described below may correspond to an electronic device 101 of FIG. 1.

Figure 2:
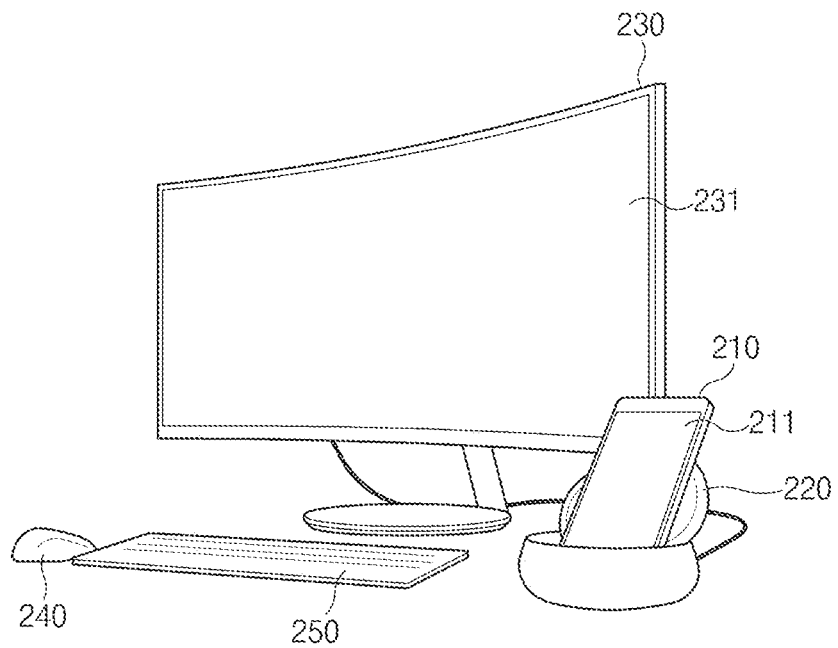
FIG. 2 illustrates an operating environment of a mobile electronic device according to an embodiment of the disclosure.

FIG. 2 illustrates an operating environment of a mobile electronic device according to an embodiment of the disclosure.

Referring to FIG. 2, a mobile electronic device 210 may be connected to an interface device 220 and an external display device 230. The mobile electronic device 210 may be a mobile device whose display 211 is relatively small in size relative to the external display device 230. For example, the mobile electronic device 210 may be a smart phone, a tablet PC, a wearable device, or the like.

According to various embodiments of the disclosure, the display 211 of the mobile electronic device 210 may include a touch panel (or a touch sensor) therein. The display 211 may receive a touch input of a user. The touch input of the user sensed through the display 211 may be converted to an electrical signal and forwarded to a processor in the mobile electronic device 210. According to various embodiments, the display 211 of the mobile electronic device 210 may include a pressure sensor therein. The pressure sensor may sense the intensity with which the user presses the display 211. The pressure sensor may convert a user input to an electrical signal according to the intensity of the pressure and may forward the electrical signal to a processor in the mobile electronic device 210.

According to various embodiments of the disclosure, at least a portion of the display 211 may operate as an input device (e.g., a touch pad) under a specified condition (e.g., whether the external display device 230 is connected, an external pointing device 240 is connected, or the like). For example, when the display 211 operates as a touch pad, the touch input of a user may be reflected on a movement of a mouse pointer or a cursor or a click operation output onto a screen of the external display device 230.

The interface device 220 may connect the mobile electronic device 210 and the external display device 230. The interface device 220 may be, for example, a dock (or a docking station). The interface device 220 may include a mount for mounting the mobile electronic device 210. FIG. 2 illustrates the mobile electronic device 210 that is mounted on the interface device 220 in a portrait mode, but the embodiment is not limited thereto. For example, the mobile electronic device 210 may be mounted on the interface device 220 in a landscape mode. For example, the interface device 220 may be connected to the mobile electronic device 210 through an input/output interface such as a USB port, and the like.

According to various embodiments of the disclosure, the interface device 220 may include a port for a wired connection with an external input device (e.g., the pointing device 240, a keyboard device 250, and the like). When an external input device is connected to the port, information about the connection with the external input device may be provided to the mobile electronic device 210.

The external display device 230 may be a device (e.g., a monitor, a TV, and the like) that outputs content provided from the mobile electronic device 210. The external display device 230 may output the same screen as the display 211 of the mobile electronic device 210 (e.g., mirroring), or may output a screen that is at least partially different from the display 211.

The external display device 230 may be connected to the mobile electronic device 210 through the interface device 220.

According to various embodiments of the disclosure, the mobile electronic device 210 may output contents (e.g., an image, a text, a picture, and the like) through the external display device 230 when the mobile electronic device 210 is connected to the external display device 230 (or, when the mobile electronic device 210 is in a communication enable state). The mobile electronic device 210 may reconfigure at least a portion of the contents displayed on the display 211 and output the reconfigured screen through the external display device 230. For example, the mobile electronic device 210 may output a user interface similar to that using a desktop PC through a display 231 of the external display device 230.

The mobile electronic device 210 may be wired or wirelessly connected to an external input device such as an external pointing device (e.g., a mouse or a touchpad) 240, an external keyboard device 250, or the like. The mobile electronic device 210 may receive a user input through the external pointing device 240 or the external keyboard device 250. The user may control the contents output through the mobile electronic device 210 or the external display device 230 by using the external pointing device 240 or the external keyboard device 250.

Figure 3:
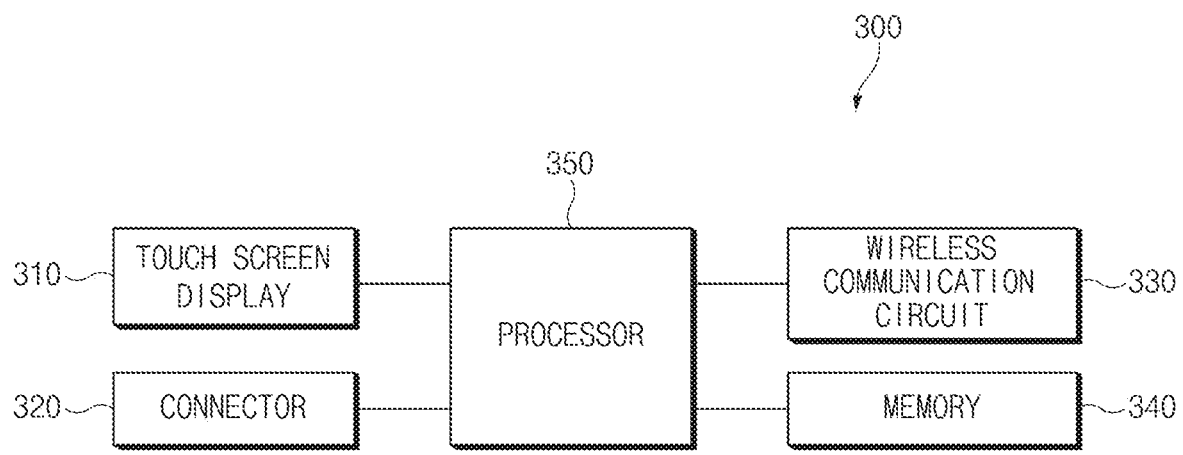
FIG. 3 is a block diagram illustrating a mobile electronic device according to an embodiment of the disclosure.

FIG. 3 is a block diagram illustrating a mobile electronic device according to an embodiment of the disclosure.

Referring to FIG. 3, a mobile electronic device may include a housing, a touch screen display 310, a connector 320, a wireless communication circuit 330, a memory 340, at least one processor 350, and the like.

The housing is a frame that can accommodate the components 310 to 350 of the mobile electronic device.

The touch screen display 310 (e.g., the display device 160 and the display 211) may output an execution screen of an application, or the like. In an embodiment, the touch screen display 310 may be implemented with a touch panel (e.g., a touch screen display, or the like). According to an embodiment of the disclosure, the touch screen display 310 may be exposed through the housing.

The connector 320 may be a connection port for connecting the mobile electronic device 300 to an interface device. For example, the mobile electronic device may be electrically connected to a connector of the interface device through the connector 320. The connector 320 may be, for example, a USB—C type connector, a micro 5-pin connector, a lightning connector, or the like.

The wireless communication circuit 330 (e.g., the wireless communication module 192) may allow the mobile electronic device 300 to wirelessly communicate with an external server, an external device, or the like.

According to various embodiments of the disclosure, the wireless communication circuit 330 may transmit a screen of an application output by the mobile electronic device 300 to an external display device.

The memory 340 (e.g., the memory 130) may be electrically connected to the at least one processor 350 and may store instructions that are executed by the at least one processor 350. According to an embodiment of the disclosure, the memory 340 may store an application that are executed by the processor 350 or resources for providing a service through the touch screen display 310. According to an embodiment of the disclosure, the memory 340 may include a general area and a security area. The general area and the security area may be separated, and the applications included in the general area cannot access the security area without permission.

The at least one processor 350 (e.g., the processor 120 shown in FIG. 1) may execute instructions stored in the memory 340 to perform the operations described below.

According to various embodiments of the disclosure, the mobile electronic device 300 may further include a digitizer (not shown). According to various embodiments, the processor 350 may receive an input from a digitizer pen through the digitizer.

Figure 4:
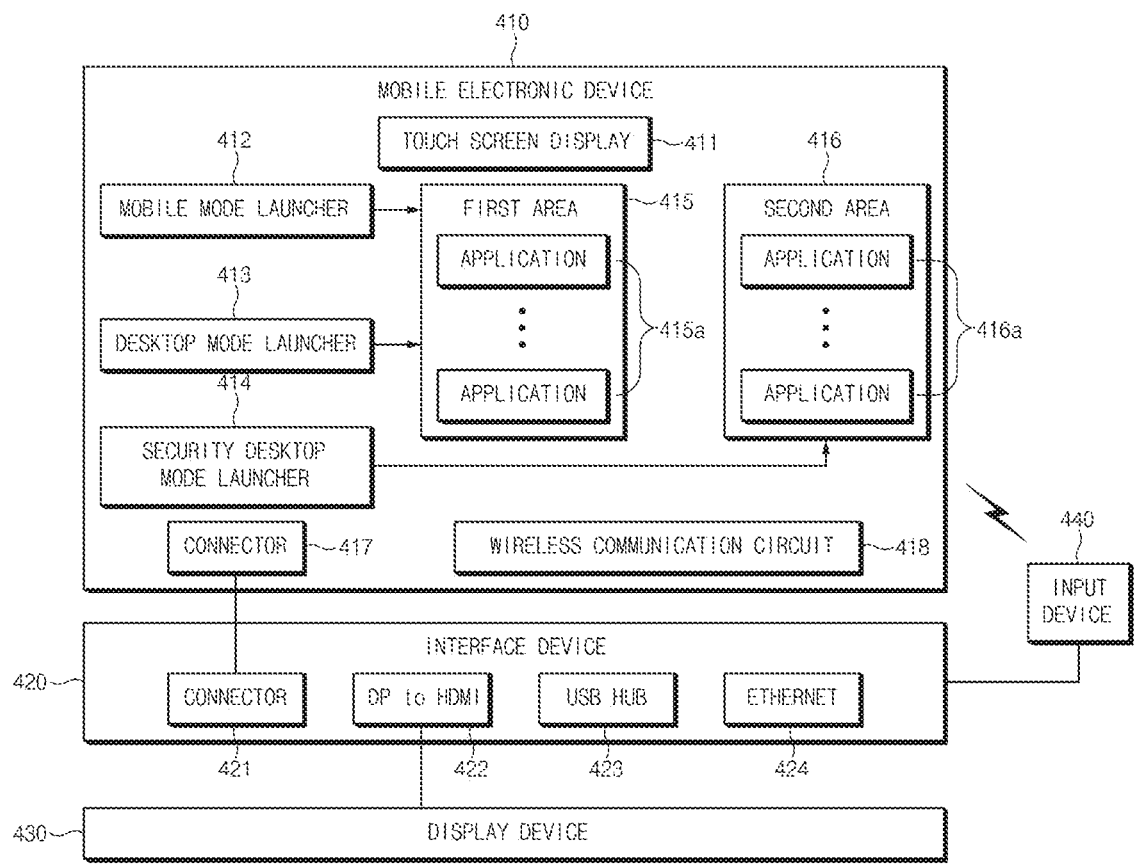
FIG. 4 is a block diagram illustrating a mobile electronic device, an interface device, a display device, and an input device according to an embodiment of the disclosure.

FIG. 4 is a block diagram illustrating a mobile electronic device 410, an interface device 420, a display device 430, and an input device 440 according to an embodiment of the disclosure.

Referring to FIG. 4, according to an embodiment of the disclosure, the mobile electronic device 410 may correspond to the mobile electronic device 300 described with reference to FIG. 3. According to an embodiment of the disclosure, the mobile electronic device 410 may include a touch screen display 411, a mobile mode launcher 412, a desktop mode launcher 413, a security desktop mode launcher 414, a first area 415, a second area 416, a connector 417, a wireless communication circuit 418, and the like. According to an embodiment, the mobile electronic device 410 may further include a wired communication circuit although not shown in FIG. 4.

According to an embodiment of the disclosure, the touch screen display 411, the connector 417, and the wireless communication circuit 418 may correspond to the touch screen display 310, the connector 320, and the wireless communication circuit 330 described with reference to FIG. 3.

According to an embodiment of the disclosure, the processor may execute instructions stored in the memory, thereby implementing the mobile mode launcher 412, the desktop mode launcher 413, the security desktop mode launcher 414, one or more applications 415a included in the first area 415, and one or more applications 416a included in the second area 416. Thus, the operations performed by the modules may be understood to be performed by the processor.

The mobile mode launcher 412 may be a program that displays an initial screen displayed on the display of the mobile electronic device 410 and the list of applications included in the general area. According to an embodiment, the mobile mode launcher 412 may be included in the first area 415 of the memory.

The desktop mode launcher 413 may be a program that displays an initial screen displayed on the external display device 430 through the interface device 420 and the list of applications included in the general area. According to an embodiment, the desktop mode launcher 413 may be included in the first area 415 of the memory.

The security desktop mode launcher 414 may be a program that displays an initial screen displayed on the external display device 430 through the interface device 420 and the list of applications included in the security area of the memory. According to an embodiment, the security desktop mode launcher 414 may be included in the second area 416 of memory.

According to an embodiment of the disclosure, the processor may execute the desktop mode launcher 413 or the security desktop mode launcher 414 when the mobile electronic device 410 is connected to the interface device 420 through the connector 417.

According to an embodiment of the disclosure, the first area 415 and the second area 416 may be included in the memory. According to an embodiment, the first area 415 may be a general area and the second area 416 may be a security area.

According to an embodiment of the disclosure, the applications included in each area may share data with each other, and the applications included in different areas cannot share data with each other without permission.

For example, the first area 415 may include first and third applications, and the second area 416 may include second and fourth applications. According to an embodiment of the disclosure, the first and third applications may share data with each other, and the second and fourth applications may share data with each other. To the contrary, the first and second applications may not share data with each other.

According to an embodiment of the disclosure, when the application included in the first area 415 and the application included in the second area 416 are applications specified in advance to provide the same function, the applications included in the first area 415 and the application included in the second area 416 may share data with each other.

For example, the first area 415 may include the first application and the second area 416 may include the second application. According to an embodiment of the disclosure, the first and second applications may provide a telephone function and may applications specified in advance to share data with each other. In this case, the first and second applications may share call list data with each other. According to an embodiment of the disclosure, the pre-specified application may include at least one of a telephone application, a contact application, a message application, or a calendar application.

According to an embodiment of the disclosure, the interface device 420 may include a connector 421, a display port (DP) to HDMI module 422, a USB hub 423, an Ethernet module 424, and the like.

The connector 421 may connect the interface device 420 to the mobile electronic device 410. For example, the connector 421 of the interface device 420 may be electrically connected to the connector 417 of the mobile electronic device 410. For example, the connector 421 may be a USB—C type connector, a micro 5-pin connector, a lightning connector, or the like.

The DP to HDMI module 422 may mirror a screen output by the mobile electronic device 410 connected through the connector 421. For example, the DP to HDMI module 422 may convert a signal output from the mobile electronic device 410 into a signal complying with a high definition multimedia interface (HDMI) standard.

The USB hub 423 expands one USB port to a plurality of USB ports such that a plurality of USB devices may be connected to the interface device 420.

One end of the Ethernet module 424 may be connected to the connector 421 and an opposite end thereof may be connected to an RJ45 port (not shown). According to an embodiment, the Ethernet module 424 may enable the mobile electronic device 410 to use wired internet.

According to an embodiment of the disclosure, the display device 430 may display a screen received through the interface device 420 and output by the mobile electronic device 410.

According to an embodiment of the disclosure, the display device 430 may be connected to the DP to HDMI module 422 of the interface device 420. According to an embodiment, the display device 430 may display a screen of the desktop mode launcher 413 and a screen of an application by using a signal complying with the HDMI standard and output by the DP to HDMI module 422.

According to an embodiment of the disclosure, the display device 430 may receive a screen output by the mobile electronic device 410 through the wireless communication circuit 418. According to an embodiment, the display device 430 may display a screen received through the wireless communication circuit 418.

According to one embodiment of the disclosure, the input device 440 may forward a user input to the mobile electronic device 410. According to an embodiment, the input device 440 may be connected to the mobile electronic device 410 through the interface device 420 or may be directly connected to the mobile electronic device 410.

According to an embodiment of the disclosure, the input device 440 may be connected to the interface device 420 through a USB port (not shown) of the interface device 420. According to an embodiment, the interface device 420 may enable the connected input device 440 to operatively connected to the mobile electronic device 410. In other words, the interface device 420 may forward the user input received from the input device 440 to the mobile electronic device 410 through the connector 421.

According to an embodiment of the disclosure, the input device 440 may be directly connected to the mobile electronic device 410 by using wireless communication (e.g., Bluetooth).

According to an embodiment of the disclosure, the input device 440 may include at least one of a mouse, a keyboard, or a tablet. According to an embodiment, the plurality of input devices 440 may be connected to the mobile electronic device 410. For example, the first input device 440 of the plurality of input devices 440 may be connected to the mobile electronic device 410 through the interface device 420 and the second input device 440 may be connected to the mobile electronic device 410 by using wireless communication.

Figure 5:
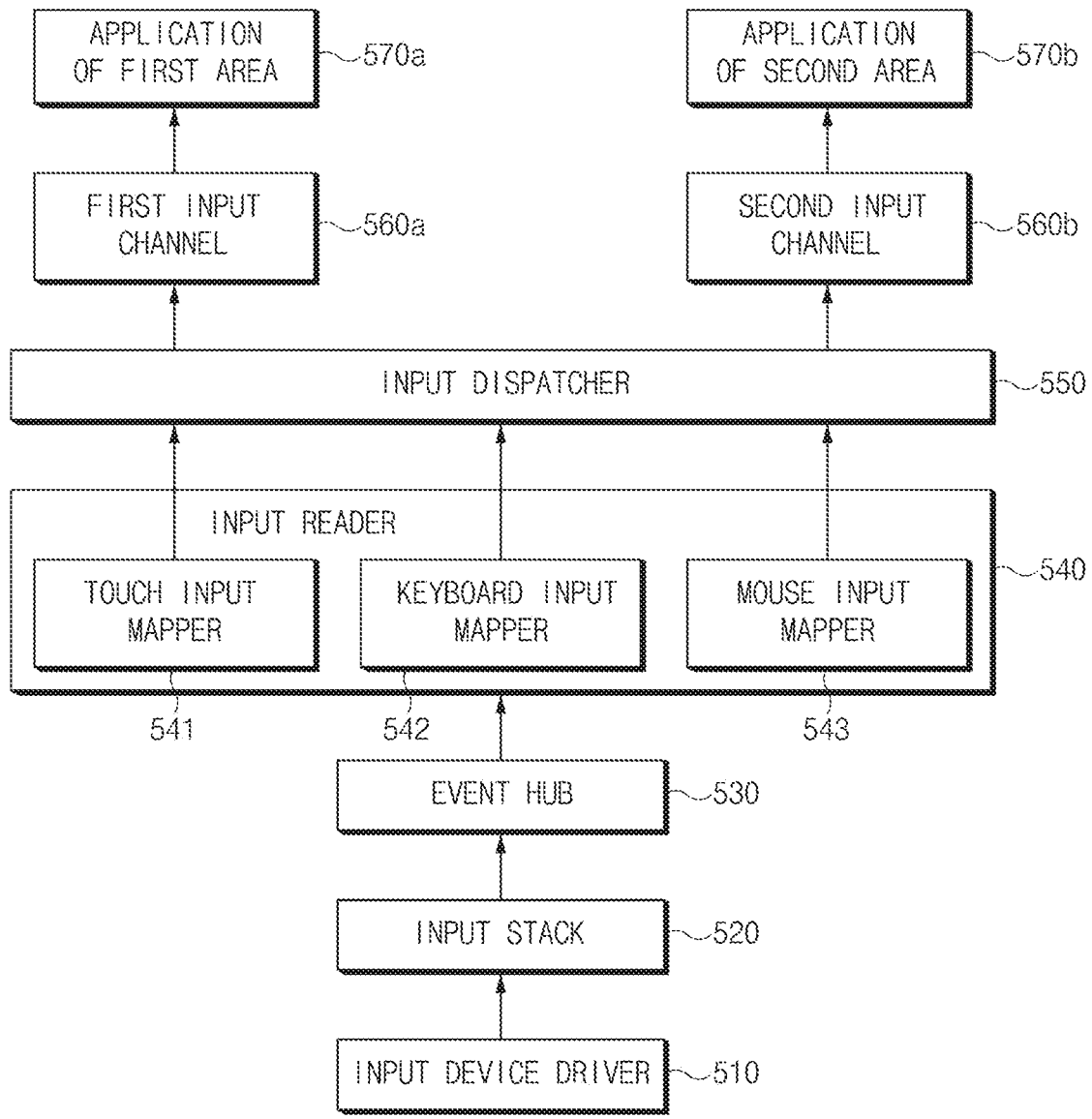
FIG. 5 is a block diagram illustrating a software module for processing an input according to an embodiment of the disclosure.

FIG. 5 is a block diagram illustrating a software module for processing an input according to an embodiment of the disclosure.

Referring to FIG. 5, according to an embodiment of the disclosure, an input device driver 510 may process a user input through an input device. For example, the input device driver 510 may include information about driving schemes, properties, functions, and the like of a plurality of input devices. The input device driver 510 may use the included information to forward the user input received from the input device to an input stack 520.

The input stack 520 may store a user input event received from the input device driver 510.

An event hub 530 may perform the connection and disconnection of an input device, the input reading of the input device, and the like. According to an embodiment of the disclosure, the event hub 530 may search for an input device that forwards the user input to the input device driver 510 and may store the user input event stored in the input stack 520 in an event queue.

An input reader 540 may include a touch input mapper 541, a keyboard input mapper 542, a mouse input mapper 543, and the like. However, the input mappers that the input reader 540 can include are not limited to the illustrated input mappers.

The input mapper included in the input reader 540 may process the user input event stored in the event queue.

According to an embodiment of the disclosure, the touch input mapper 541 may attach a tag to a touch input event such that the touch input event received through the touch screen display is forwarded to a pre-specified application. For example, the touch input mapper 541 may attach a tag to a touch input event such that the touch input event is forwarded to an application in the first area. According to various embodiments, the touch input mapper 541 may attach a tag to a touch input event such that the touch input event is forwarded to an application of the second area.

According to an embodiment of the disclosure, the keyboard input mapper 542 may attach a tag to a keyboard input event such that the keyboard input event received through the touch screen display is forwarded to a pre-specified application. For example, the keyboard input mapper 542 may attach a tag to a keyboard input event such that the keyboard input event is forwarded to an application in the second area. According to various embodiments of the disclosure, the keyboard input mapper 542 may attach a tag to a keyboard input event such that the keyboard input event is forwarded to an application in the first area.

According to an embodiment of the disclosure, the mouse input mapper 543 may attach a tag to a mouse input event such that the mouse input event received through the touch screen display is forwarded to a pre-specified application. For example, the mouse input mapper 543 may attach a tag to a mouse input event such that the mouse input event is forwarded to an application in the second area. According to various embodiments of the disclosure, the mouse input mapper 543 may attach a tag to a mouse input event such that the mouse input event is forwarded to an application in the first area.

An input dispatcher 550 may forward an input event processed by the input mapper stored in the event queue to an application through an input channel.

For example, the input dispatcher 550 may forward a touch input event processed by the touch input mapper 541 stored in the event queue to an application 570a in the first area through a first input channel 560a. As another example, the input dispatcher 550 may forward a touch input event processed by the keyboard input mapper 542 or mouse input mapper 543 stored in the event queue to an application 570b in the second area through a second input channel 560b.

According to an embodiment of the disclosure, in accordance with the process of processing the input described above, the processor may forward a received user input only to an application set according to an input device. In other words, according to the setting according to the input device, the user input may be forwarded only to the application included in a specified area.

Figure 6:
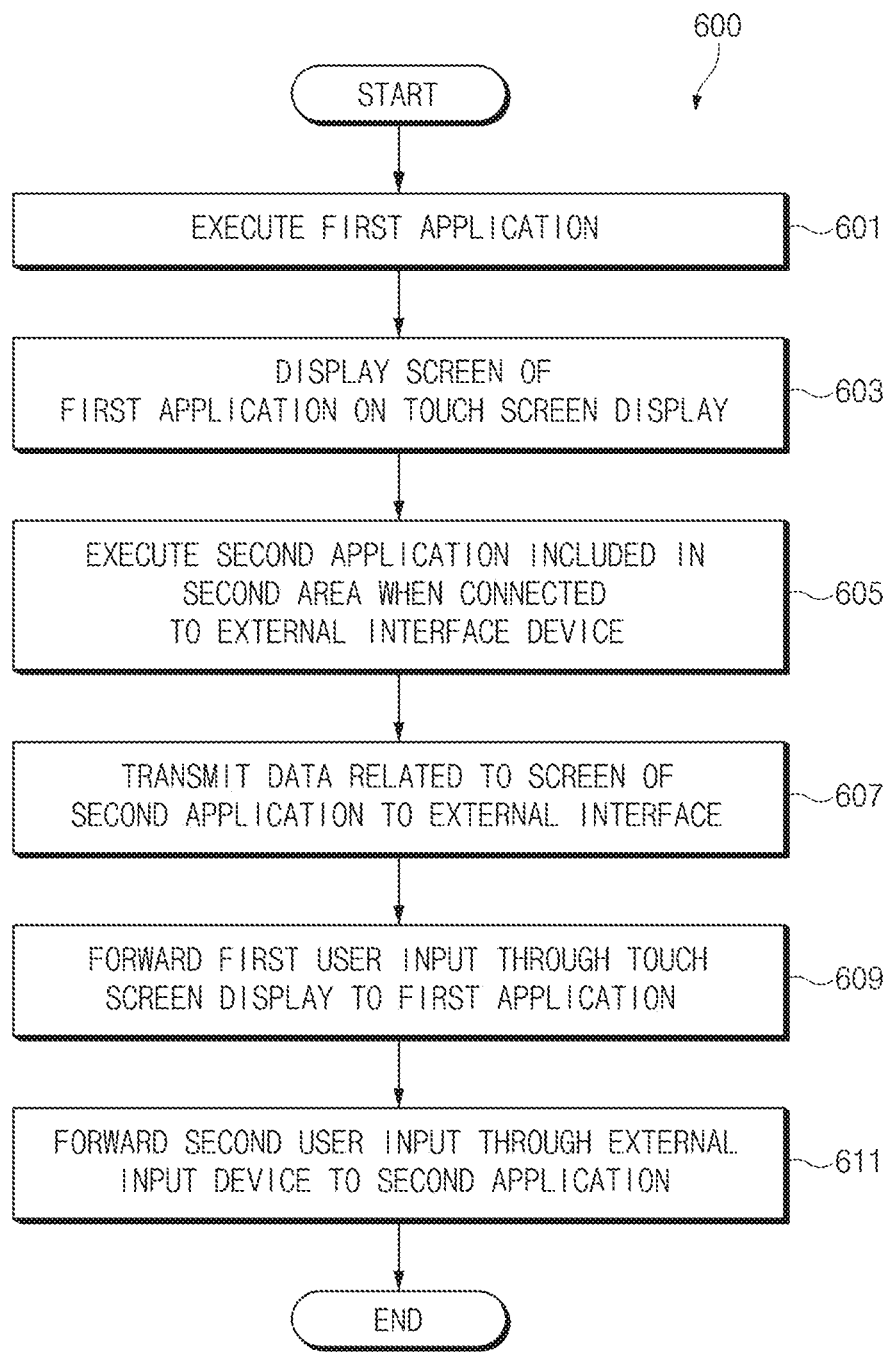
FIG. 6 is a flowchart illustrating a method of forwarding a user input to an application according to an embodiment of the disclosure.

FIG. 6 is a flowchart 600 illustrating a method of forwarding a user input to an application according to an embodiment of the disclosure.

Referring to FIG. 6, hereinafter, it is assumed that the mobile electronic device 300 of FIG. 3 performs the process of FIG. 6. The operations described as being performed by the mobile electronic device 300 may be implemented with instructions that may be performed (or executed) by the processor 350 of the mobile electronic device 300. For example, the instructions may be stored in a computer recording medium or in the memory 340 of the mobile electronic device 300 shown in FIG. 3.

In operation 601, the processor 350 may execute the first application included in the first area of the memory 340.

According to an embodiment of the disclosure, the first area of the memory 340 may be a general area.

In operation 603, the processor 350 may display a screen of the first application on the touch screen display 310.

In operation 605, the processor 350 may execute the second application included in the second area of the memory 340 when connected to the external interface device 420 through the connector 320.

According to an embodiment of the disclosure, the external interface device 420 may be the interface device 420 described with reference to FIGS. 2 and 4.

According to an embodiment of the disclosure, the second area of the memory 340 may be a security area separated from the general area.

In operation 607, the processor 350 may transmit data related to the screen of the second application to the external interface device 420 through the connector 320.

According to an embodiment of the disclosure, the data related to the screen of the second application may include data for the external display device to display the screen of the second application.

In operation 609, the processor 350 may forward the first user input through the touch screen display 310 to the first application.

According to an embodiment of the disclosure, the processor 350 may not forward the first user input through the touch screen display 310 to the second application.

In operation 611, the processor 350 may forward the second user input through an external input device operatively connected through at least one of the wireless communication circuit 330 or the connector 320, to the second application.

According to an embodiment of the disclosure, the processor 350 may not forward the second user input through the external input device to the first application.

According to various embodiments of the disclosure, before operation 601, the processor 350 may display a screen of the first launcher included in the first area of the memory 340 on the touch screen display 310. According to an embodiment, the screen of the first launcher may include an initial screen displayed on the touch screen display 310 and a list of applications included in the general area.

According to an embodiment of the disclosure, the processor 350 may execute the second launcher included in the second area of the memory 340 when connected to the external interface device 420 through the connector 320.

According to an embodiment of the disclosure, the processor 350 may transmit data related to the screen of the second launcher to the external interface device 420 through the connector 320. According to an embodiment, the screen of the second launcher may include an initial screen displayed on the external display device and a list of applications included in the security area.

According to one embodiment of the disclosure, the processor 350 may forward the first user input via the touch screen display 310 to the first launcher and not forward to the second launcher. According to an embodiment, the processor 350 may forward the second user input through an external input device operatively connected through at least one of the wireless communication circuit 330 or the connector 320, to the second launcher and not forward to the first launcher.

According to an embodiment of the disclosure, when the processor 350 receives a user input through the touch screen display 310 for selecting an application included in the screen of the first launcher, the processor 350 may execute the selected application and may display the screen of the executed application on the touch screen display 310.

According to an embodiment of the disclosure, when the processor 350 receives a user input through an external input device for selecting an application included in the screen of the second launcher, the processor 350 may execute the selected application and may transmit data related to the screen of the executed application to the external interface device 420 through the connector 320.

According to various embodiments of the disclosure, the processor 350 may be operatively connected to a plurality of external input devices through at least one of the wireless communication circuit 330 or the connector 320.

According to various embodiments of the disclosure, the processor 350 may forward the user input through the first input device of the plurality of input devices to the first application included in the first area of the memory 340, and may forward the user input through the second input device to the second application included in the second area of the memory 340. For example, the processor 350 may be connected to the wireless mouse and the wireless keyboard through the wireless communication circuit 330. According to an embodiment, the processor 350 may forward the user input through the wireless mouse only to the second application included in the second area of the memory 340, and may forward the user input through the wireless keyboard only to the first application included in the first area of the memory 340.

According to various embodiments of the disclosure, the mobile electronic device 300 may further include a wired communication circuit.

According to an embodiment of the disclosure, the processor 350 may forward the data received through one of the wireless communication circuit 330 and the wired communication circuit to the first application and not forward to the second application. According to an embodiment of the disclosure, the processor 350 may forward the data received through the other of the wireless communication circuit 330 and the wired communication circuit to the second application and not forward to the first application.

For example, the processor 350 may forward the data received through Wi-Fi only to the first application included in the first area, and forward the data received through wired LAN communication only to the second application included in the second area.

According to various embodiments of the disclosure, the mobile electronic device 300 may be connected to a wired communication network through the interface device 420. According to an embodiment, the processor 350 may forward the data received through the wireless communication circuit 330 only to the first application. According to an embodiment of the disclosure, the processor 350 may forward the data received from the wired communication network through the interface device 420 only to the second application.

Figure 7:
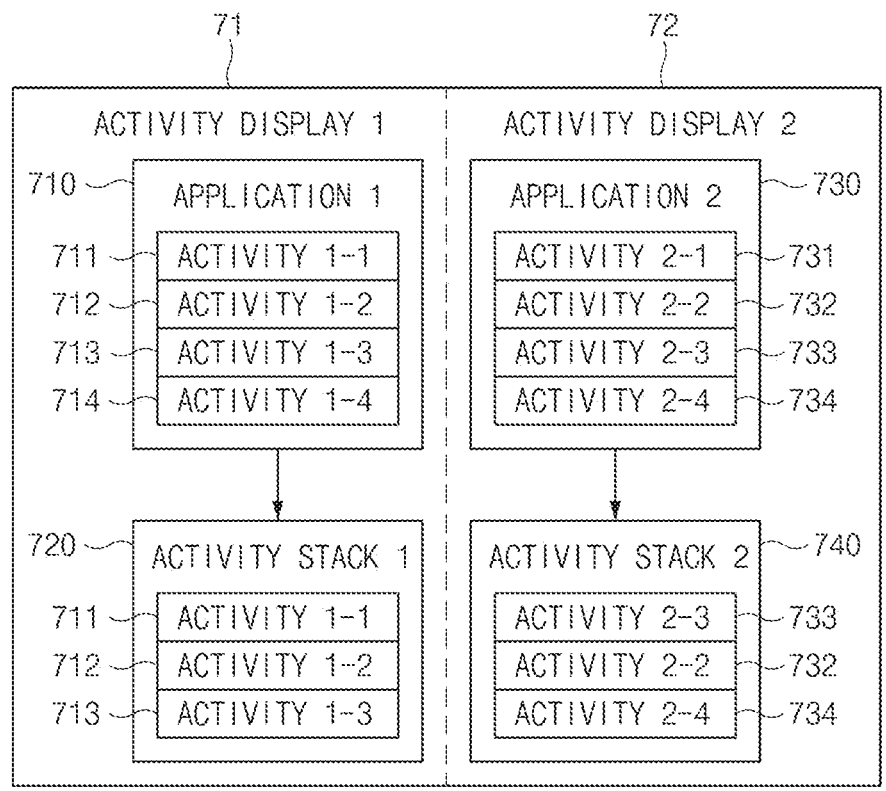
FIG. 7 is a view illustrating that an activity of an application according to an embodiment is loaded on an activity stack according to an embodiment of the disclosure.

FIG. 7 is a view illustrating that an activity of an application according to an embodiment is loaded on an activity stack.

Referring to FIG. 7, according to an embodiment of the disclosure, the processor 350 may execute instructions stored in the memory 340 to implement an activity display.

According to an embodiment of the disclosure, the activity display may include an activity stack that manages the activity of an application.

The activity stack may keep an activity that is executed in an application. The activity stack may include consecutive activities. According to an embodiment of the disclosure, the activity stack may keep activities in a first-in last-out form, and the most recently loaded activity may be used first. For example, when activity 1, activity 2, and activity 3 are loaded in turn on the activity stack, activity 3 may be activated on the display. That is, the window corresponding to activity 3 in the display may be focused.

Referring to FIG. 7, the processor 350 may execute the instructions stored in the memory 340 to implement activity display 1 71 and activity display 2 72.

According to an embodiment of the disclosure, the processor 350 may generate an activity display for each of the touch screen display 310 and the external display device. For example, the processor 350 may generate the activity display 1 71 for the touch screen display 310 and the activity display 2 72 for the external display device.

According to an embodiment of the disclosure, an application 1 710 may be an application stored in the first area of the memory 340 and an application 2 730 may be an application stored in the second area of the memory 340. According to an embodiment of the disclosure, the application 1 710 may include activity 1-1 711, activity 1-2 712, activity 1-3 713, and activity 1-4 714, and the application 2 730 may include activity 2-1 731, activity 2-2 732, activity 2-3 733, and activity 2-4 734.

According to an embodiment of the disclosure, in activity display 1 71, activity 1-3 713, activity 1-2 712, and activity 1-1 711 of application 1 710 may be sequentially loaded on activity stack 1 720. According to an embodiment, in activity display 2 72, activity 2-4 734, activity 2-2 732 and activity 2-3 733 of application 2 730 may be sequentially loaded on activity stack 2 740.

According to an embodiment of the disclosure, the processor 350 may implement both activity display 1 71 and activity display 2 72 simultaneously. Since the activity display 1 71 and the activity display 2 72 are simultaneously implemented, the activity 1-1 711 which is the top activity of the activity stack 1 720 and the activity 2-3 733 which is the top activity of the activity stack 2 740 may be activated at the same time. That is, while the window corresponding to activity 1-1 711 remains in the focused state (e.g., a state where a window can receive a user input) on the touch screen display 310 of the mobile electronic device, the window corresponding to the activity 2-3 733 may be maintained in the focused state on the external display device. In an embodiment, the user input through the touch screen display 310 may be forwarded to the activated activity 1-1 711 of the application 1 710 and the user input through the external input device may be forwarded to the activated activity 2-3 733 of the application 2 730.

Figure 8A:
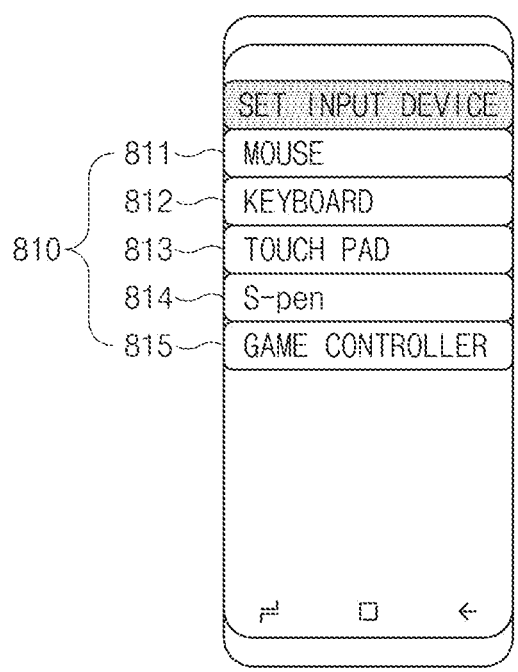
FIG. 8A is a view illustrating a screen on which a list of input devices is displayed on a display according to an embodiment of the disclosure.

FIG. 8A is a view illustrating a screen on which a list of input devices is displayed on a display according to an embodiment of the disclosure.

Figure 8B:
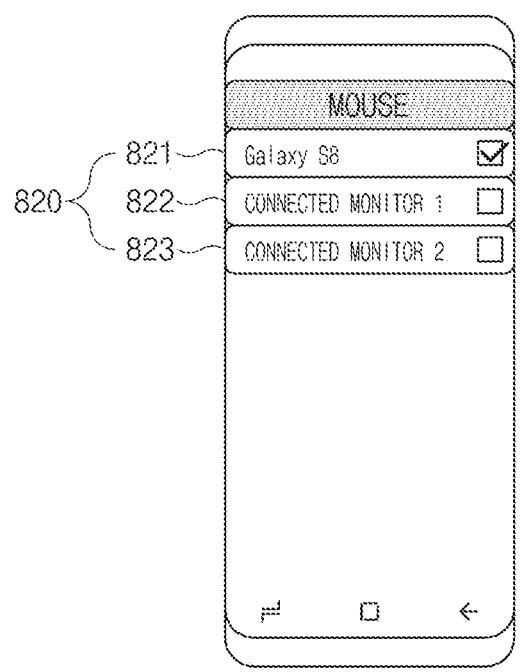
FIG. 8B is a view illustrating a screen for setting a display device to which a mouse input is forwarded according to an embodiment is forwarded.

FIG. 8B is a view illustrating a screen for setting a display device to which a mouse input is forwarded according to an embodiment is forwarded.

Referring to FIGS. 8A and 8B, the mobile electronic device 300 may receive a user input in various input schemes. According to an embodiment of the disclosure, the processor 350 may display a screen for setting a display to which a user input is transmitted for each input device as shown in FIG. 8A. In an embodiment, as shown in FIG. 8A, the processor 350 may display an input device list 810. In an embodiment, the input device list may include a mouse 811, a keyboard 812, a touch pad 813, an S-pen 814, and a game controller 815.

According to an embodiment of the disclosure, when a user input for selecting the mouse 811 is received, as shown in FIG. 8B, the processor 350 may include a display list 820 which a user input through the mouse 811 may be forwarded. According to an embodiment, the display list 820 may include "Galaxy S8®" (the display of a mobile electronic device) 821, connected monitor 1 822 and connected monitor 2 823. In an embodiment, the user input through the mouse 811 may be set to be forwarded to "Galaxy S8®". According to an embodiment, a screen of an application included in the general area of the memory 340 may be displayed on the display of the mobile electronic device 300, and the user input through the mouse 811 may be forwarded to the application included in the general area.

Figure 9A:
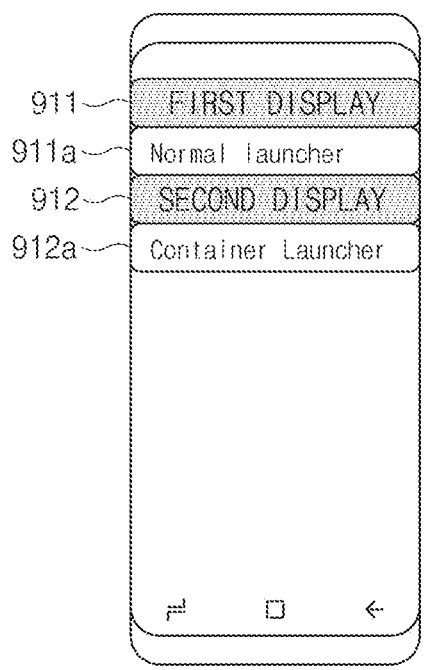
FIG. 9A is a view illustrating a screen for setting a launcher displayed on each display device according to an embodiment of the disclosure.

FIG. 9A is a view illustrating a screen for setting a launcher displayed on each display device according to an embodiment of the disclosure.

Referring to FIG. 9A, according to an embodiment of the disclosure, a first display 911 of FIG. 9A may be the touch screen display 310 of the mobile electronic device 300, and a second display 912 may be an external display device connected to the mobile electronic device 300 through the interface device 420. According to an embodiment, a normal launcher 911a included in the general area of the memory 340 may be displayed on the first display 911, and a container launcher 912a included in the security area of the memory 340 may be displayed on the second display 912. According to an embodiment, the container launcher 912a may be displayed on the first display 911 and the normal launcher 911a may be displayed on the second display 912 by a setting change input of a user.

Figure 9B:
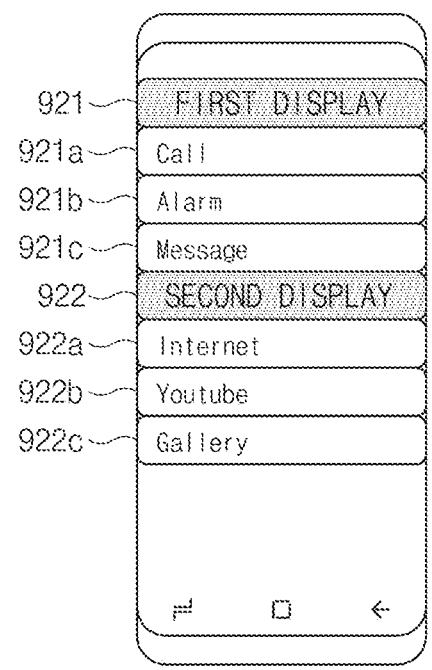
FIG. 9B is a view illustrating a screen showing a list of applications displayed on each display device according to an embodiment of the disclosure.

FIG. 9B is a view illustrating a screen showing a list of applications displayed on each display device according to an embodiment of the disclosure.

Referring to FIG. 9B, according to an embodiment of the disclosure, an application displayed on each display may be set. For example, "Call" (a telephone application) 921*a* "Alarm" (an alarm application) 921*b*, and "Message" (a message application) 921*c* may be displayed on the first display 921. "Internet" (an internet application) 922*a*, "Youtube" (a YouTube application) 922*b*, and "Gallery" (a gallery application) 922*c* may be displayed on the second display 922.

According to an embodiment of the disclosure, an application displayed on each display may be changed by the setting change input of a user.

A mobile electronic device according to an embodiment of the disclosed in the disclosure may include a connector, a touch screen display, a memory including a first area and a second area, a wireless communication circuit, and at least one processor, wherein the at least one processor executes a first application included in the first area, displays a screen of the first application on the touch screen display, executes a second application included in the second area when being connected to an external interface device through the connector, transmits data related to a screen of the second application through the connector to the external interface device, forwards a first user input through the touch screen display to the first application and not forward to the second application, and forwards a second user input through a first external input device, which is operatively connected through at least one of the wireless communication circuit or the connector, to the second application and not forward to the first application.

In an embodiment of the disclosure, one of the first and second areas may be a security area.

In an embodiment of the disclosure, the first area may further include a third application, the second area may further include a fourth application, the first and third applications may share data with each other, and the second and fourth applications may share data with each other.

In an embodiment of the disclosure, the first and second applications may share data with each other when the first and second applications are applications specified in advance to provide a same function.

In an embodiment of the disclosure, the first and second applications may include at least one of a telephone application, a contact application, a message application, or a calendar application.

In an embodiment of the disclosure, the mobile electronic device may further include a wired communication circuit, wherein the at least one processor forwards data received through one of the wireless communication circuit and the wired communication circuit to the first application and not forward to the second application, and forwards data received through the other of the wireless communication circuit and the wired communication circuit to the second application and not forward to the first application.

In an embodiment of the disclosure, the first external input device may include at least one of a mouse, a keyboard, or a tablet.

In an embodiment of the disclosure, the at least one processor may display a screen of a first launcher, which is included in the first area, on the touch screen display before executing the first application, execute a second launcher included in the second area before executing the second application when being connected to the external interface device through the connector, transmit data related to a screen of the second launcher through the connector to the external interface device, forward the first user input through the touch screen display to the first launcher and not forward to the second launcher, and forward the second user input through the first external input device to the second launcher and not forward to the first launcher.

In an embodiment of the disclosure, the at least one processor may keep all windows of the first and second applications in a simultaneously focused state.

In an embodiment of the disclosure, the at least one processor may operatively connect with a second external input device through at least one of the wireless communication circuit or the connector, and may forward a third user input through the second external input device to the first application and not forward to the second application.

In addition, a method of processing a user input by a mobile electronic device according to another embodiment disclosed in the disclosure may include executing a first application included in a first area of a memory, displaying a screen of the first application on a touch screen display of the mobile electronic device, executing a second application included in a second area of the memory when the mobile electronic device is connected to an external interface device, transmitting data related to a screen of the second application to the external interface device, forwarding a first user input received through the touch screen display to not the second application but the first application, and forwarding a second user input through an external input device, which is operatively connected with the mobile electronic device, to not the first application but the second application.

In an embodiment of the disclosure, one of the first and second areas may be a security area.

In an embodiment of the disclosure, the method may further include forwarding data received through one of a wireless communication circuit and a wired communication circuit to not the second application but the first application, and forwarding data received through the other of the wireless communication circuit and the wired communication circuit to not the first application but the second application.

In an embodiment of the disclosure, the first external input device may include at least one of a mouse, a keyboard, or a tablet.

In an embodiment of the disclosure, the method may further include keeping all windows of the first and second applications in a simultaneously focused state.

In addition of the disclosure, according to another embodiment disclosed in the disclosure, a storage medium storing computer-readable instructions may be provided, wherein, when the instructions are executed by a processor of a mobile electronic device, the instructions cause the mobile electronic device to execute a first application included in a first area of a memory, display a screen of the first application on a touch screen display, execute a second application included in a second area of the memory when the mobile electronic device is connected to an external interface device, transmit data related to a screen of the second application to the external interface device, forward a first user input received through the touch screen display to not the second application but the first application, and forward a second user input through an external input device, which is operatively connected with the mobile electronic device, to not the first application but the second application.

In an embodiment of the disclosure, one of the first and second areas may be a security area.

In an embodiment of the disclosure, when the instructions are executed by the processor of the mobile electronic device, the instructions may cause the mobile electronic device to forward data received through one of a wireless communication circuit and a wired communication circuit to not the second application but the first application, and forward data received through the other the other of the wireless communication circuit and the wired communication circuit to not the first application but the second application.

In an embodiment of the disclosure, the first external input device may include at least one of a mouse, a keyboard, or a tablet.

In an embodiment of the disclosure, when the instructions are executed by the processor of the mobile electronic device, the instructions may further cause the mobile electronic device to keep all windows of the first and second applications in a simultaneously focused state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A mobile electronic device comprising:
   a connector;
   a touch screen display;
   a memory comprising a non-secure area and a secure area;
   a wireless communication circuit; and
   at least one processor configured to:
   execute a first application included in one of the non-secure area or the secure area,
   display a screen of the first application on the touch screen display, execute a second application included in another of the non-secure area or the secure area when being connected to an external interface device through the connector, transmit data related to a screen of the second application through the connector to the external interface device, forward a first user input through the touch screen display to the first application and not to the second application, and forward a second user input through a first external input device to the second application and not to the first application, wherein the first external input device is operatively connected through at least one of the wireless communication circuit or the connector, wherein the first and second applications are configured to share data with each other when the first and second applications are predetermined applications configured to perform tasks of a same type of function, wherein data sharing between the first and second applications is restricted when the first and second applications are not the predetermined applications, wherein a first activity associated with one of the non-secure area or the secure area and a second activity associated with another of the non-secure area or the secure area are managed by different activity stacks, wherein the different activity stacks keep activities in a first-in last-out form, and wherein the shared data is included in the secure area.

2. The mobile electronic device of claim 1, wherein the one of the non-secure area or the secure area comprises a third application, wherein another of the non-secure area or the secure area comprises a fourth application, wherein the first and third applications are configured to share data with each other, and wherein the second and fourth applications are configured to share data with each other.

3. The mobile electronic device of claim 1, wherein the first and second applications comprise at least one of a telephone application, a contact application, a message application, or a calendar application.

4. The mobile electronic device of claim 1, further comprising:

a wired communication circuit, wherein the at least one processor is further configured to:

forward data received through one of the wireless communication circuit or the wired communication circuit to the first application and not to the second application, and forward data received through another of the wireless communication circuit or the wired communication circuit to the second application and not to the first application.

5. The mobile electronic device of claim 1, wherein the first external input device comprises at least one of a mouse, a keyboard, or a tablet.

6. The mobile electronic device of claim 1, wherein the at least one processor is further configured to:

display a screen of a first launcher, which is included in the one of the non-secure area or the secure area, on the touch screen display before executing the first application;

execute a second launcher, which is included in another of the non-secure area or the secure area, before executing the second application when being connected to the external interface device through the connector;

transmit data related to the screen of the second launcher through the connector to the external interface device;

forward the first user input through the touch screen display to the first launcher and not to the second launcher; and forward the second user input through the first external input device to the second launcher and not to the first launcher.

7. The mobile electronic device of claim 1, wherein the at least one processor is further configured to simultaneously maintain a window of the first application and a window of the second application in a focused state.

8. The mobile electronic device of claim 1, wherein the at least one processor is further configured to:

operatively connect with a second external input device through at least one of the wireless communication circuit or the connector; and forward a third user input through the second external input device to the first application and not to the second application.

9. The mobile electronic device of claim 1, wherein the shared data is used in the execution of the task of the same function by at least one of the first and second applications.

10. A method of processing a user input by a mobile electronic device, the method comprising:

executing a first application included in one of a non-secure area or a secure area of a memory;

displaying a screen of the first application on a touch screen display of the mobile electronic device;

executing a second application included in another of the non-secure area or the secure area when the mobile electronic device is connected to an external interface device;

transmitting data related to a screen of the second application to the external interface device;

forwarding a first user input received through the touch screen display to the first application and not to the second application; and forwarding a second user input through an external input device to the second application and not to the first application, wherein the external input device is operatively connected with the mobile electronic device, wherein the first and second applications are configured to share data with each other when the first and second applications are predetermined applications configured to perform tasks of a same type of function, wherein data sharing between the first and second applications is restricted when the first and second applications are not the predetermined applications, wherein a first activity associated with one of the non-secure area or the secure area and a second activity associated with another of the non-secure area or the secure area are managed by different activity stacks, wherein the different activity stacks keep activities in a first-in last-out form, and wherein the shared data is included in the secure area.

11. The method of claim 10, further comprising:

forwarding data received through one of a wireless communication circuit or a wired communication circuit to the first application and not to the second application; and forwarding data received through another of the wireless communication circuit or the wired communication circuit to the second application and not to the first application.

12. The method of claim 10, wherein the external input device comprises at least one of a mouse, a keyboard, or a tablet.

13. The method of claim 10, further comprising:
simultaneously maintaining a window of the first application and a window of the second application in a focused state.

14. The method of claim 10, further comprising:
displaying a screen of a first launcher, which is included in the one of the non-secure area or the secure area, on the touch screen display before executing the first application;
executing a second launcher, which is included in another of the non-secure area or the secure area, before executing the second application when being connected to the external interface device;
transmitting data related to the screen of the second launcher to the external interface device;
forwarding the first user input through the touch screen display to the first launcher and not to the second launcher; and
forwarding the second user input through the external input device to the second launcher and not to the first launcher.

15. A non-transitory storage medium storing computer-readable instructions, wherein, when the instructions are executed by at least one processor of a mobile electronic device, the instructions are configured to cause the at least one processor to:
execute a first application included in one of a non-secure area or a secure area of a memory;
display a screen of the first application on a touch screen display;
execute a second application included in another of the non-secure area or the secure area when the mobile electronic device is connected to an external interface device;
transmit data related to a screen of the second application to the external interface device;
forward a first user input received through the touch screen display to the first application and not to the second application; and
forward a second user input through an external input device to the second application and not to the first application,
wherein the external input device is operatively connected with the mobile electronic device,
wherein the first and second applications are configured to share data with each other when the first and second applications are predetermined applications configured to perform tasks of a same type of function,
wherein data sharing between the first and second applications is restricted when the first and second applications are not the predetermined applications,
wherein a first activity associated with one of the non-secure area or the secure area and a second activity associated with another of the non-secure area or the secure area are managed by different activity stacks,
wherein the different activity stacks keep activities in a first-in last-out form, and
wherein the shared data is included in the secure area.

16. The non-transitory storage medium of claim 15, wherein, when the instructions are executed by the at least one processor of the mobile electronic device, the instructions are further configured to cause the at least one processor to:
forward data received through one of a wireless communication circuit or a wired communication circuit to the first application and not to the second application; and
forward data received through another of the wireless communication circuit or the wired communication circuit to the second application and not to the first application.

17. The non-transitory storage medium of claim 15, wherein the external input device comprises at least one of a mouse, a keyboard, or a tablet.

18. The non-transitory storage medium of claim 15, wherein, when the instructions are executed by the at least one processor of the mobile electronic device, the instructions are further configured to cause the at least one processor to simultaneously maintain a window of the first application and a window of the second application in a focused state.

19. The non-transitory storage medium of claim 15, wherein, when the instructions are executed by the at least one processor of the mobile electronic device, the instructions are further configured to cause the at least one processor to:
display a screen of a first launcher, which is included in the one of the non-secure area or the secure area, on the touch screen display before executing the first application;
execute a second launcher, which is included in another of the non-secure area or the secure area, before executing the second application when being connected to the external interface device;
transmit data related to a screen of the second launcher to the external interface device;
forward the first user input through the touch screen display to the first launcher and not to the second launcher; and
forward the second user input through the external input device to the second launcher and not to the first launcher.

* * * * *